Aug. 19, 1924.

G. H. HAYES 1,505,562

SHOCK ABSORBER

Filed March 20, 1922    2 Sheets-Sheet 1

Inventor
GEORGE H. HAYES
By [signature]
ATTORNEYS

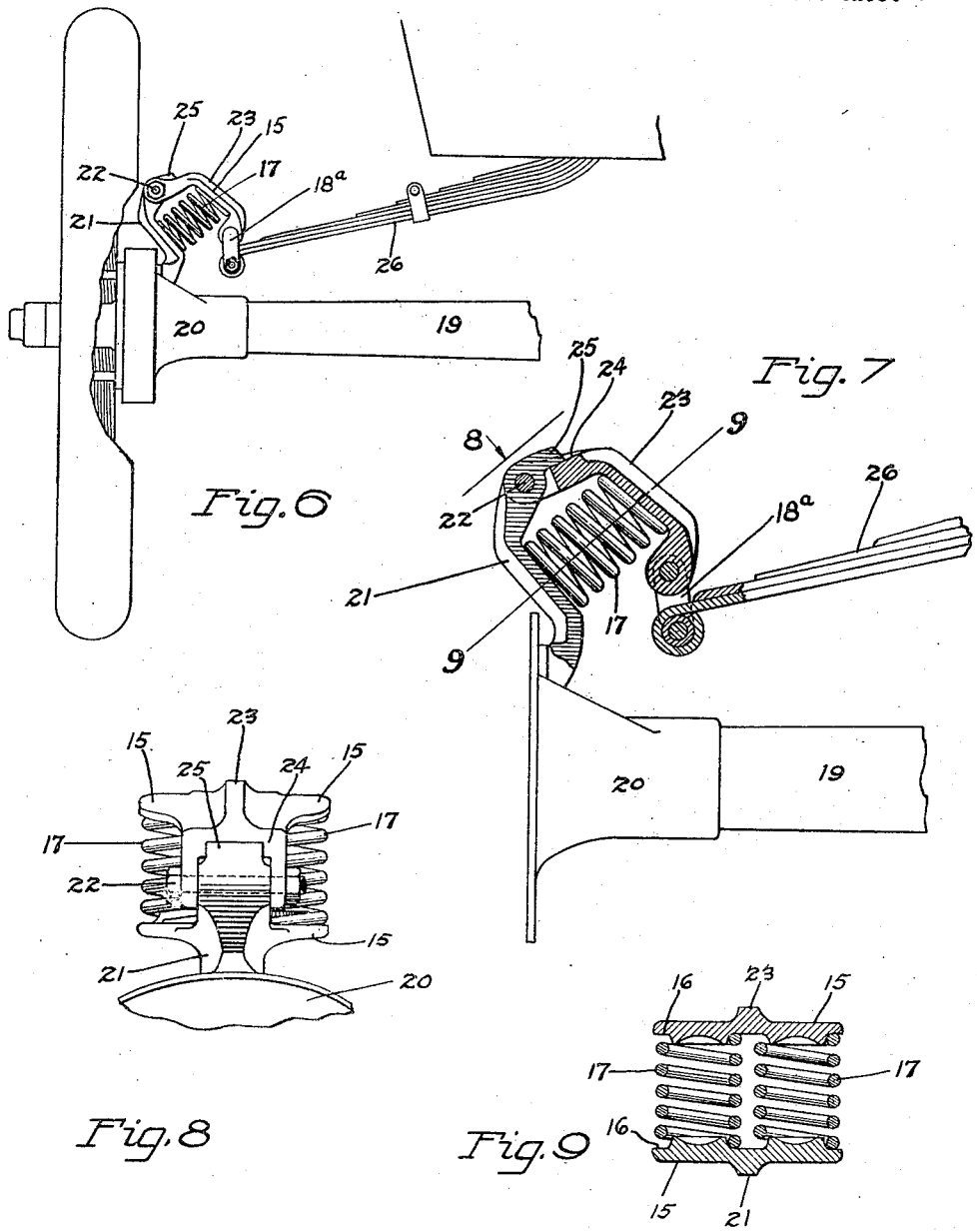

Patented Aug. 19, 1924.

1,505,562

UNITED STATES PATENT OFFICE.

GEORGE H. HAYES, OF MINNEAPOLIS, MINNESOTA.

SHOCK ABSORBER.

Application filed March 20, 1922. Serial No. 545,143.

*To all whom it may concern:*

Be it known that I, GEORGE H. HAYES, a citizen of the United States, resident of Minneapolis, county of Hennepin, State of Minnesota, have invented certain new and useful Improvements in Shock Absorbers, of which the following is a specification.

The object of my invention is to provide a shock absorber adapted particularly for use with vehicles having front and rear transverse springs between the axles and vehicle body.

A further object is to provide a comparatively simple inexpensive device by means of which the lateral lurch or thrust of the vehicle body on the springs will be yieldingly resisted, thereby preventing jolt and jar to the occupants of the vehicle.

A further object is to provide a shock absorber which will allow normal action of the car springs, will prevent side sway and the multiple lever construction and position enables the device to absorb extreme shocks with comparatively little movement of the coil springs.

A further object is to provide a device of comparatively few parts and one that is easily attached or mounted by slipping it between the axle and the spring end.

The invention consists generally in various constructions and combinations, all as hereinafter described and particularly pointed out in the claims.

Figure 1:
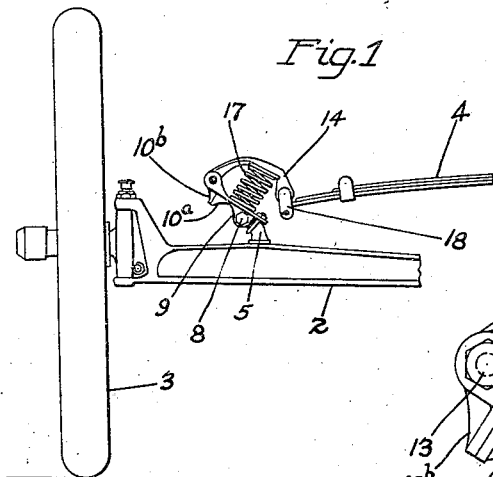
Figure 2:
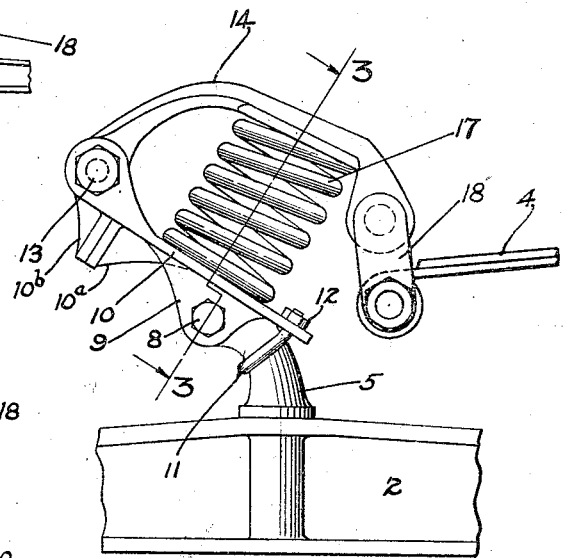
Figure 3:
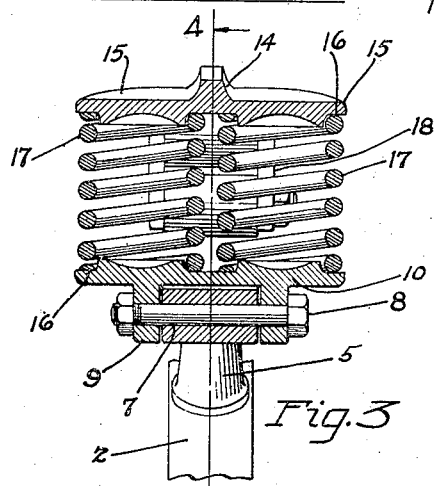
Figure 4:
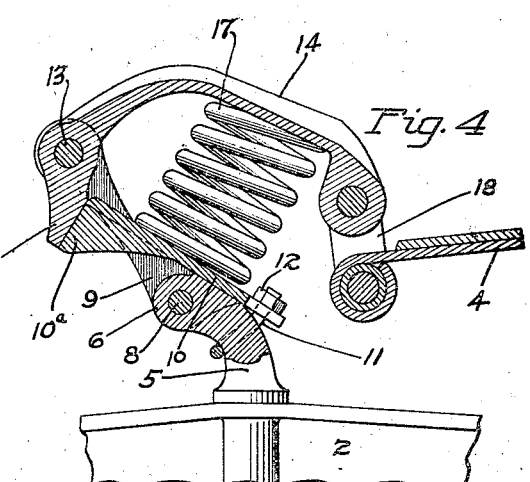
Figure 5:
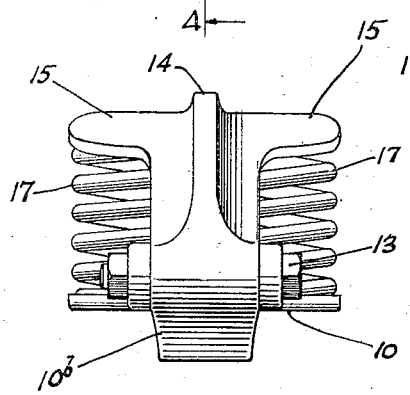

In the accompanying drawings forming part of this specification,

Figure 1 is a front view of a portion of a vehicle axle and spring, showing my improved shock absorber applied thereto, Figure 2 is an enlarged detail view showing the manner of mounting the shock absorber, Figure 3 is a sectional view on the line 3—3 of Figure 2, Figure 4 is a sectional view on the line 4—4 of Figure 3, Figure 5 is an end view of the shock absorber, Figure 6 illustrates the application of the device to the rear of the vehicle, Figure 7 is a sectional view of the same, Figure 8 is an end view looking in the direction of the arrow, Figure 9 is a sectional view on the line 9—9 of Figure 7, In the drawing, 2 represents the forward axle of the vehicle, 3 the supporting wheel therefor and 4 the forward cross spring, usually of the half elliptic type, 5 is a stud mounted on the axle, there being one on each end of the axle, but as they are identical in arrangement and construction, it is sufficient for the purpose of this case to show one only.

The stud 5 is outwardly turned at its upper end and provided with a boss 6 having a long bearing surface 7 therein for the bolt 8 which passes through lugs 9 depending from the inside of a member 10 which forms the lower section of the shock absorber. The lugs 9 preferably straddle the boss 6, as shown in Figure 3, and a U-bolt 11 passes around the shank of the stud 5 and has its ends secured by nuts 12 within sockets in the end of the member 10. The upper end of the member 10 has a pivot bolt 13 on which the upper member 14 of the shock absorber is mounted, this member being substantially bow-shaped and overhanging the member 10. The opposing surfaces of the members 10 and 14 have outwardly projecting webs or flanges 15 thereon provided with seats 16 for compression springs 17, preferably arranged in pairs between the members of the shock absorber and adapted to be compressed when the load is applied to the member 14. The application of the load to this member is preferably by means of a link 18 pivotally connected at one end to the member 14 and at its other end to the spring 4, allowing a slight longitudinal movement of the spring transversely of the vehicle and transmitting downward and outward pull of the spring to the compression springs 17.

The relative arrangement of the members 10 and 14 and the connection of the link 18 with the member 14 provides for a considerable vertical movement of the link and the end of spring 4 with comparatively little compression of the coil springs. In other words, the member 14 serves as a lever, its axis being at 13, the power being applied through the link at the opposite end and the resistance of the coil spring forming the load intermediate to the ends.

The member 10 has a stop $10^a$ thereon and a lug $10^b$ is provided on the end of the member 14 for contact with the stop $10^a$, as indicated in Figure 2, thereby limiting separation of the members under the tension of the compression springs between them. On the rebound of the springs and the member 14, the stop 10ª serves as a check to limit the separation of the members.

In Figures 6 to 9 inclusive I have illustrated the invention applied to the rear of the vehicle, in which 19 represents the rear axle housing, 20 the brake band housing whereto the upright shock absorber member 21 is rigidly secured at its lower end. At its upper end this member is pivoted at 22 to the other member 23, said member having surfaces intermediate to their ends provided with seats corresponding to those described with reference to the other shock absorber for receiving the ends of the compression springs. The member 23 also has a surface 24 to receive a lug 25 on the end of the member 21, thereby forming a stop to resist the separation of the members. The load is applied to the member 23 through the link 18ª corresponding to the one shown in the previous figures. The spring 26 for the rear of the vehicle is also pivotally connected with the link 18ª and through this link the load is transmitted from the vehicle and spring to the shock absorber.

I claim as my invention:

1. A shock absorber comprising a member rigidly supported at one end and having an inclined upper surface, a second member having one end pivotally connected with the other end of said rigidly supported member, a compression spring seated upon said inclined surface between said members and a vehicle body spring pivotally connected with the other end of said second member.

2. A shock absorber comprising a member rigidly supported at its lower end and projecting upwardly and outwardly at an incline, a second member pivotally connected with the upper end of said first named member for vertical oscillation, a compression spring seated at an incline to the vertical between said members, and a vehicle body spring pivotally connected with said second member.

3. A shock absorber comprising a pair of members pivotally connected at one end, one of said members being rigidly mounted and having inclined surface thereon, the other member having a pivotal connection with a vehicle body, and a compression spring seated upon said surface between said members between their pivotal connection with one another and the connection of one member with the vehicle.

4. A shock absorber comprising an upwardly projecting member rigidly supported at its lower end and having an outwardly inclined seat at its middle portion, a second member pivotally connected at one end with the upper end of said first named member and also having a seat opposing the seat of said first named member, a compression spring interposed between said members and bearing on said seats and means pivotally connecting the other end of said second member with the vehicle body.

5. A shock absorber comprising a rigidly supported member, a second member having a pivotal connection with said rigidly supported member, a link pivotally connected with said second member and with the vehicle body spring, and inwardly inclined compression springs interposed between said members and yieldingly resisting downward and outward movement of said second member.

6. A shock absorber comprising an upright member rigidly supported at its lower end, a second member having a comparatively long pivotal bearing upon the upper end of said rigid member, a pivotal connection for the other end of said second member, said members having opposing inclined surfaces, and a compression spring interposed between said members intermediate to their pivoted ends and seated on said surfaces.

7. The combination, with a vehicle axle, of a shock absorber member rigidly supported thereon and projecting upwardly and outwardly, a second member pivotally connected with the upper end of said first named member and extending inwardly therefrom, means connected with the vehicle body and having a pivotal connection with the inner end of said second member, and a compression spring interposed between said members and yieldingly resisting downward and outward pressure of said second member thereon.

8. The combination, with an axle, of a shock absorber member rigidly supported thereon and projecting upwardly and outwardly, a second member pivotally connected at its outer end with the upper end of said first named member and extending inwardly and downwardly therefrom, links pivotally connected with the inner end of said second member and having means connecting them with the vehicle body and a compression spring interposed between said members and yieldingly resisting downward and outward thrust of said second member thereon.

9. The combination, with a vehicle axle and body spring, of a shackle connecting said axle and spring and comprising a member rigidly supported by said axle, a second member pivotally connected at one end with the corresponding end of said rigid member and having a pivotal connection at its other end with said spring, and a compression spring interposed between said members and yieldingly resisting downward and outward thrust of said second member.

10. In combination, with an axle and body spring, a spring shackle comprising rigid members pivotally connected to one another at one end, one of said members having a rigid support on said axle, links pivotally connecting the other member with said spring for transmitting the downward thrust and lurch of said spring to said member, said members having opposing inclined surfaces, and a compression spring interposed between said members, and seated on said surfaces.

In witness whereof, I have hereunto set my hand this 14th day of March, 1912.

GEORGE H. HAYES.